FICUS ENZYME AND HYDROPHILIC CARRIER COMPOSITION
Filed April 17, 1957
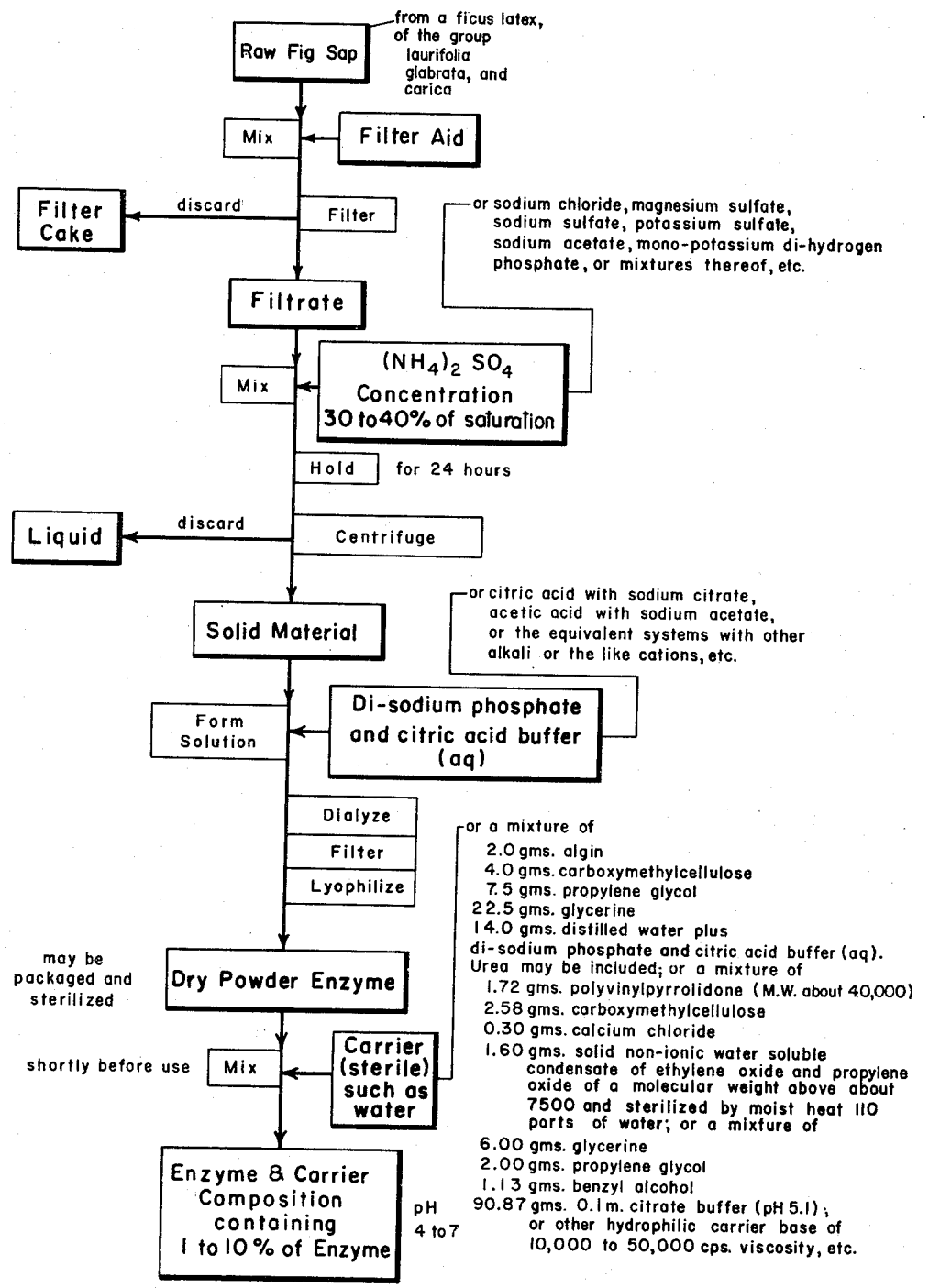

United States Patent Office 2,995,493
Patented Aug. 8, 1961

2,995,493
FICUS ENZYME AND HYDROPHILIC CARRIER COMPOSITION
Jocelyn F. Douglas, Nixon, and Eugene R. L. Gaughran, New Brunswick, N.J., assignors to Johnson & Johnson, a corporation of New Jersey
Filed Apr. 17, 1957, Ser. No. 653,310
8 Claims. (Cl. 167—73)

This invention relates to enzymatic preparations useful for removal of necrotic tissue from body lesions such as burns and varicose ulcers, i.e., debriding, and to such removal processes.

Various proposals have been made heretofore for the removal of hard leathery eschar resulting from third degree burns, or necrotic tissue resulting from other lesions of the body, e.g., third degree burns, varicose ulcers, chronic suppurations, and the like, to permit skin grafting, effective epithelization or repair of tissue. However, these leave much to be desired, and the art is still confronted by the problem of providing a material or method for rapid, safe and selective removal of such unwanted tissue, with minimum harm to the adjacent or remaining living cells.

The discoveries associated with the invention relating to solution of the above problems, and the objects achieved in accordance with the invention as set forth herein include: the provision of a debridement composition containing about 1 to 10% by weight of enzyme in a hydrophilic carrier base, which enzyme contains about 14% by weight of nitrogen, the remainder thereof being carbon, hydrogen, oxygen and sulphur, is lethal to Ascaris and has a standard spun collagen thread breaking test concentration of about 0.1%; the provision of such a composition containing a buffer and having a pH in the range of about 4 to 7; the provision of such a composition wherein the carrier base is a freely flowing liquid; the provision of such a composition wherein the carrier base is a viscous fluid or jelly; the provision of methods for debriding body lesions which comprises applying thereto any of the foregoing compositions and maintaining the same in effective contact therewith until the unwanted tissue material is successfully digested or removed; and other objects which will be apparent as details or embodiments of the invention are set forth hereinafter.

In connection with the present description, the following tests are used as standard.

STANDARD SPUN COLLAGEN BREAKING TIME TESTS

The activity of proteolytic enzymes may be determined by a standard procedure in which a thread consisting of 40 filaments of spun collagen fiber (prepared by known methods) is suspended in an aqueous test solution at 98.60 F. The test solution is buffered at a pH of 5 by McIlvaine's buffer. The collagen thread has a weight of about 113 milligrams per meter. It is held under tension by a 2-gram weight. In a series of tests the concentration of the solution is varied until a concentration is found which causes the fiber to break in 30 minutes. The numerical value thereof is the inverse of the activity of the enzyme; that is, the higher the concentration, the weaker the enzyme.

STANDARD PEROXIDASE ACTIVITY TEST

The peroxidase activity unit is measured as the number of milligrams of purpurogallin formed per milligram of powder from pyrogallol and hydrogen peroxide at 68° F., pH 6.0, in aqueous phosphate buffer (Sorenson) during a 20 second incubation period (see B. D. Polis and H. W. Shmukler, J. Bio. Chem., vol. 201, p. 476, 1953).

STANDARD ASCARIS ASSAY TEST

To 100 ml. of 1 percent by weight solution of the protein powder in pH 5.0 McIlvaine's buffer at 98.6° F. add one living intestinal porcine parasite (Ascaris) and allow to stand at 98.6° F. for 10 hours. If at this time, the worm is dead (preferably fragmented into a plurality of sections), the protein is regarded as lethal to this type of organism.

STANDARD MILK CLOTTING TEST

A 12% solution of milk powder in distilled water is brought to pH 5.5 with 5% lactic acid, and 5 ml. of this material is then incubated at 37° C. until up to temperature and 1 ml. of enzyme solution is added. The mixture is then incubated at 37° C. The time required for clotting of the milk is a measure of enzyme activity. The shorter the time, the greater the activity.

In the following description, reference is made to the accompanying drawing, which is a flow diagram of the process or processes for preparing the compositions of the invention, starting from raw fig sap.

In order to facilitate a clear understanding of the invention, the following preferred specific embodiments are described in detail.

*Example 1*

A raw fig sap latex containing proteolytic enzyme (from *Ficus laurifolia* or *Ficus glabrata* or *Ficus carica*) is first clarified by filtration or centrifugation, or both, using conventional equipment constructed of corrosion-resistant metal or alloy, such as stainless steel.

The clarified liquid (1000 parts by weight) is then treated at 40° F. with an inorganic precipitating agent such as ammonium sulphate, in an amount to give a concentration in the range of 30 to 40% of saturation of this salt in water (211.5 to 282.0 parts by weight of the salt in the liquid mixture) whereby the enzyme is selectively precipitated. If higher concentrations of the salt are used, undesirable impurities are also precipitated with the enzyme, giving a less active product. If lower concentrations are used, the active principle is not precipitated out. Similar results are obtained with other salts such as sodium chloride, magnesium sulfate, sodium sulfate, potassium sulfate, sodium acetate, mono-potassium di-hydrogen phosphate, or mixtures thereof.

The resulting precipitate is separated, e.g., by filtration or centrifugation, suspended in one-half strength McIlvaine's buffer at pH 5.0 (citric acid and dis-sodium phosphate; "Handbook of Chemistry and Physics," Chemical Rubber Publishing Co., 30th Edition, 1947, page 1405, McIlvaine standard buffer) and then dialyzed through a cellophane membrane against distilled water until all inorganic ions are removed therefrom (as determined by a check test of the distilled water), filtered, and then frozen and dried in the frozen state (in conventional apparatus)

whereby a light tan, stable powder product is obtained. It is odor-free.

At 1% by weight concentration, this product is completely soluble in pH 5.0 McIlvaine's buffer at 68° F.

In the standard spun collagen breaking test for this product, the concentration is 0.1%, whereas for commercial ficin, an 0.3% concentration is required to cause a break in 30 minutes. That is, this product shows a 3-fold higher activity.

In the standard Ascaris assay test, this product is lethal to the organism and breaks it up into three or more body fragments.

In the standard milk clotting test, 0.01% of this product clots the milk within 4 minutes; whereas in similar weight concentration commercial ficin requires about 11 minutes. That is an about 3-fold difference.

Compositions of the invention may be made up from the enzyme (separately sterilized by filtration) and a jelly base containing the following ingredients:

2.0 parts by weight algin
4.0 parts by weight carboxymethylcellulose
7.5 parts by weight propylene glycol
22.5 parts by weight glycerine
14.0 parts by weight distilled water (these ingredients having been mixed and sterilized by moist heat (autoclave)) blended with an about equal proportion of McIlvaine's buffer (which has been sterilized by filtration). In some instances, urea is also included together with the buffer material.

Such compositions have been found to be safe, effective, and reliable for human therapy. For instance, such a composition containing about 8% of the enzyme, 18% urea, and having a pH of about 5 completely cleaned a deep third degree burn so that it could be skin grafted in the usual manner giving complete healing.

In another instance, similar composition containing 5% of the enzyme completely cleaned up a second degree and third degree burn area so that it could be successfully skin grafted, with complete healing.

In another instance, a similar composition containing 7% of the enzyme cleaned up a second degree and third degree burned area so that it could be skin grafted in similar manner, with complete healing, and similar burned areas which were not given any treatment during the same period did not show similar clean-up or removal of eschar tissue.

In another instance, a similar composition containing 7% of the enzyme cleaned up about ¾ of a second degree and third degree burn area, the remainder being softened sufficiently to permit minimal mechanical debridement and skin grafting in the usual manner, with complete healing.

In another instance, a similar composition containing about 8.3% of the enzyme (but no urea) completely cleaned up an ulcer area, so that it could be skin grafted in usual manner, with complete healing.

In another instance, using a similar composition containing about 5% of the enzyme, a wound infection area (following surgery) was completely cleaned up, so as to permit skin grafting in usual manner, with complete healing. As to the latter, treatment of a similar wound area with a heretofore suggested mixture of streptokinase and streptodornase resulted in no cleaning of the wound, even after extended treatment which was continued for 15 days.

*Example 2*

These compositions are made up from a jelly base containing the following ingredients. A mixture in solid powder form of:

1.2 parts by weight polyvinylpyrrolidone (molecular weight about 40,000)
1.8 parts by weight carboxymethylcellulose (these two ingredients having been sterilized together by means of propylene oxide)
5.0 parts by weight of enzyme of Example 1 (separately sterilized by filtration)

is mixed with 0.1 M citrate buffer (sodium citrate plus citric acid, pH=5.1, separately sterilized by moist heat) to bring the final enzyme concentration to about 8%. If desired the buffer may contain enough procaine to give a 1% concentration of procaine in the final mixture, to minimize pain in a wound area where the ointment is applied. In some instances, urea also may be included together with the buffer material.

Such compositions have been found to be safe, effective, and reliable for human therapy, e.g., cleaning up a wound abscess (following an appendectomy) followed by skin grafting in usual manner with complete healing, and healing a cellulitis and gangrene ulceration of the right foot.

*Example 3*

These compositions are made up from a jelly base containing the following ingredients. A mixture is prepared of:

1.72 parts by weight polyvinylpyrrolidone (M.W. about 40,000)
2.58 parts by weight carboxymethylcellulose
0.30 parts by weight calcium chloride
1.60 parts by weight solid non-ionic water soluble condensate of ethylene oxide and propylene oxide of a molecular weight above about 7500 (such as that available commercially as "Pluronic F-68") (these ingredients having been dispersed together in 110 parts of water and sterilized by moist heat)
4.80 parts of the enzyme material of Example 1 (dissolved in 70 parts of water and sterilized by filtration)

This mixture is frozen and dried while being maintained in the frozen state, giving a friable, solid cake (11.00 parts by weight).

The following solution is prepared separately (sterilized by moist heat):

6.00 parts by weight glycerine
2.00 parts by weight propylene glycol
1.13 parts by weight benzyl alcohol
90.87 parts by weight 0.1 m. citrate buffer (pH 5.1)

In order to prepare the final constituted mixture, the latter liquid (60 parts by volume), is mixed with the 11 parts by weight of the solid powder, where the ratio of weight to volume is the same as grams to milliliters, giving an about 7% concentration of the enzyme. Urea also may be included together with the buffer material. The ratio of the volume to the weight is the same as milliliters to grams.

Such compositions have been found to be safe, effective, and reliable for human therapy. For instance, treatment with such a composition rapidly removed the necrotic skin from an avulsion laceration of the left ankle lateral aspect, leaving a cleanly granulating base which was successfully skin grafted with complete healing. In another instance, following the procedure of the preceding case, a wound infection following second stage thoracoplasty was treated, and the infected and necrotic muscle area were completely debrided with clean healthy granulations and complete healing. In another instance, treatment with this composition rapidly removed the eschar from a second degree and third degree burn area of the left hand and forearm, and subsequent epithelialization was rapid and complete. In another instance, a severe second and third degree burn of the right foot secondary to molten lead spillage was treated following the procedure of the preceding case starting on the sixth day after injury; after five days, the wound was 90% free of all necrotic tissue and epithelialization and grafting were successfully carried out. In another instance, a severe third degree burn of the right arm was treated following the procedure of the preceding case; on the eighth day following injury, the treatment was started and in five days, the wound was completely debrided and then successfully skin-grafted.

During the treatments in each of the above cases, the usual liver function, renal, and hematological studies were made, and no signs of systemic toxicity were found. The results obtained in accordance with the invention are regarded as more rapid, complete and atraumatic than obtainable by any heretofore proposed materials or methods.

The materials of the invention are also useful for exploratory purposes such as in the case of severely burned areas wherein the depth or extent of the burn cannot be determined readily. In one instance, using a composition of above type containing about 8% of the enzyme a burned area was sufficiently cleaned up to disclose bony structure, and this indicated appropriate surgery. Also, simultaneous treatment of burned scalp area showed that the burn had penetrated through the aponeurosis; and appropriate surgery was indicated. This type of treatment is also useful for cleaning complicated wound areas to disclose the condition of underlying diseased living tissue.

The benzyl alcohol in the above formulation markedly minimizes or eliminates burning or stinging sensations associated with application of the ointment to a wound area.

The hydrophilic carrier base may be water or an aqueous solution or dispersion of a water soluble or dispersible gum or high molecular weight material which gives a mixture having the desired viscosity and clinging or adhering property. The final composition may have a viscosity of about one centipoise, that is a free-flowing liquid; or, it may have infinite viscosity, that is, it may be a gel. Generally, the free-flowing liquid composition may be used where the wound area has been surrounded by a dam-like structure and the treated liquid is flowed or irrigated over the wound area. Where it is desired to apply the material to a wound area and have it adhere sufficiently to enable the enzyme to digest or remove the unwanted tissue, a composition having a viscosity in the range of about 10,000 to 75,000 centipoises is desirable, and such a composition having up to 50,000 centipoises viscosity is preferred.

The non-ionic agents employed in the compositions of the present invention are the normally solid water-soluble condensation products of ethylene oxide with propylene glycol, said product having a molecular weight of about 5,000 to about 10,000 and an ethylene oxide content of about 75–90% by weight. These materials are described also in the Journal of the American Oil Chemists Society, June 1952, pages 240–243. The polypropylene glycol represents the hydrophobic portion of the molecule, exhibiting sufficient water-insolubility per se at a molecular weight of at least about 900, such as about 900 to 2400, and preferably about 1200 to 1800. The increasing addition or condensation of ethylene oxide on a given water-insoluble polypropylene glycol tends to increase its water-solubility and increase its melting point until there is obtained a normally solid water-soluble product by the condensing of sufficient ethylene oxide. Such products may be designated by the following structure:

$$HO-(C_2H_4O)_a(C_3H_6O)_b(C_2H_4O)_cH$$

wherein $(C_3H_6O)_b$ is a polypropylene glycol residue of sufficient number of moles or molecular weight ($b$) to render the same water-insoluble or hydrophobic, and $(a)+(c)$ represent the number of moles of ethylene oxide condensed therewith to render the product normally solid and water-soluble.

It is preferred to use such products having a total molecular weight within the range of about 7,000 to 8,000. A typical commercial material which has given excellent results is designated as "Pluronic F–68." This material is considered to have a typical average molecular weight of about 7500, the hydrophobic polypropylene glycol being condensed with sufficient ethylene oxide until a normally solid water-soluble product is obtained which has an ethylene oxide content of about 80–90%. It has a melting point usually of about 51–54° C.

The polyvinylpyrrolidone is available commercially (e.g., as Plasdone) and a 1% aqueous solution thereof has a K (Fikentscher) value of 30±2.

The enzyme material may be sterilized and packaged in dry form, and the carrier base solids mixture, in dry form, may be sterilized and packaged separately. Alternatively, all the solids may be in one such package. Just before use, the solid ingredients may be mixed with distilled water, or the desired buffer system, to provide the desired composition ready for use.

The above packaged materials may be stored at room or ambient temperatures, and retain their sterility and activity for long periods of time.

The buffer system may be any known system which provides the desired pH of 4 to 7; e.g., citric acid with sodium citrate, acetic acid with sodium acetate, or the equivalent systems with other alkali or the like cations, or the like.

If desired, other known treatment methods may be used in the debridement procedure; e.g., pre-treatment with saline, antiseptic agents, or the like. Generally, in accordance with accepted practice, the debridement treatment is started after the patient has recovered generally from the shock or imbalance associated with a severe burn.

In view of the foregoing disclosures, variations or modifications thereof will be apparent, and it is intended to include within the invention all such variations and modifications except as do not come within the scope of the appended claims.

This application is a continuation-in-part of Serial No. 544,605, filed November 2, 1955, and now abandoned.

We claim:

1. A composition adapted for debridement of deep burn eschar by topical application comprising an about 1 to 10% by weight concentration mixture with a hydrophilic carrier base of a peroxidase-free proteolytic enzyme containing about 14% by weight nitrogen, the remainder being carbon, hydrogen, nitrogen and sulphur, said enzyme having a standard spun collagen breaking test concentration of about 0.1%, said enzyme having been obtained from a ficus latex of the group consisting of *laurifolia, glabrata* and *carica*, by (a) separating the liquid from the latex, (b) treating this liquid with ammonium sulfate at a concentration in the range of 30 to 40% of saturation and separating the resulting precipitate, (c) dissolving this precipitate in aqueous buffer, and (d) removing all inorganic ions from the resulting solution, and said composition being buffered at a pH in the range of about 4 to 7.

2. A composition of claim 1 wherin the base is a freely flowing liquid containing a buffer and having a pH in the range of about 4 to 7.

3. A composition of claim 1 wherin the base is a viscous liquid having a viscosity in the range of about 10,000 to 50,000 centipoises at room temperature containing a buffer and having a pH in the range of about 4 to 7.

4. A composition of claim 3 including algin and carboxymethylcellulose.

5. A composition of claim 3 including polyvinylpyrrolidone and carboxymethylcellulose.

6. A composition of claim 5 including a solid water soluble condensate of ethylene oxide and propylene oxide.

7. A composition of claim 6 including benzyl alcohol.

8. A composition consisting essentially of part (1) an aqueous carrier and part (2) an enzyme derived from a ficus latex of the group consisting of *laurifolia, glabrata* and *carica*, and the composition being buffered at a pH in the range of about 4 to 7, said enzyme having been obtained by (a) separating the liquid from the latex, (b) treating this liquid with ammonium sulfate at a concentration in the range of 30 to 40% of saturation and separating the resulting precipitate, (c) dissolving this precipitate in aqueous buffer, and (d) dialyzing, filtering and drying, said parts adapted to form, upon mixing, the composition of claim 1.

References Cited in the file of this patent

Ullman et al.: Exp. Med. and Surgery, vol. 3, pp. 11–23, 1945.

Altemeier et al.: 134:4, pp. 581–583, October 1951.

Hwang: Ann. N.Y. Acad. Sci. 54:2, pp. 191–196, May 16, 1951.

Ziffren: Surgical Forum, Am. Coll. of Surg., pp. 405–410, March 1951.

Heilesen; J. Invest-Derm. 23:1, pp. 7–15, July 1954.

"Varidase," pub. by Lederle Labs., pp. 35–37, June 1951.

"Enzymes," Sumner and Somers, 3rd Ed., 1953, Acad. Press, N.Y.

Chem. Abst., 46: 11455b, 1952.